Oct. 18, 1949.                J. HANSEN                2,485,198
METHOD AND MEANS FOR OPERATING HIGH VOLTAGE STATIC
      CURRENT CONVERTERS USING IONIC VALVES
              Filed Jan. 10, 1947
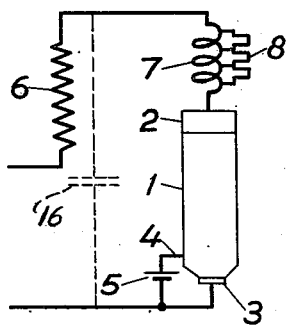
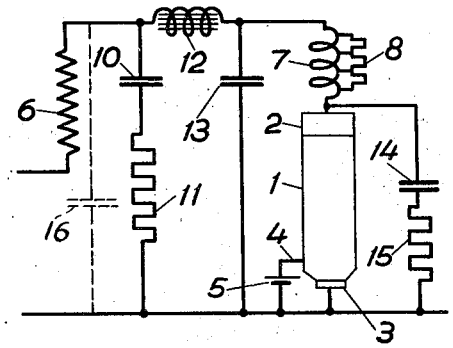
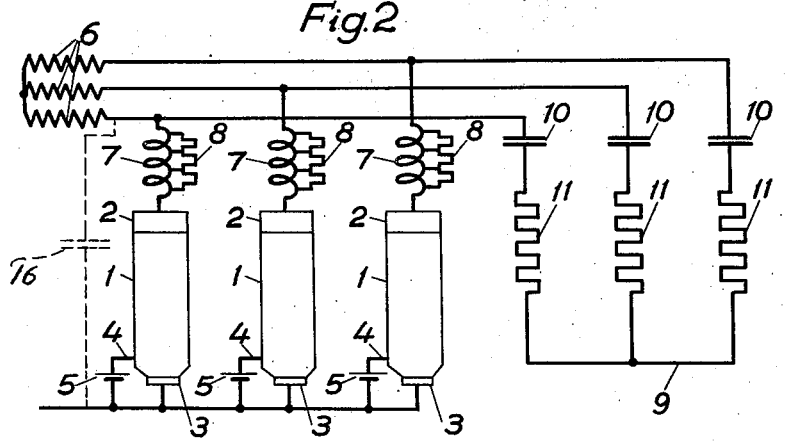
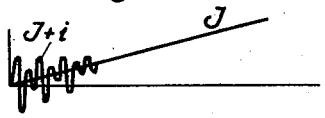
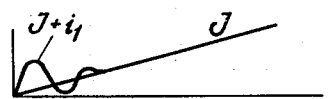
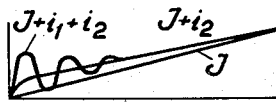
Inventor.
Johannes Hansen
By [signature]
Attorney.

UNITED STATES PATENT OFFICE 2,485,198

METHOD AND MEANS FOR OPERATING HIGH VOLTAGE STATIC CURRENT CONVERTERS USING IONIC VALUES

Johannes Hansen, Ludvika, Sweden, assignor to Allmanna Svenska Elektriska Aktiebolaget, Vasteras, Sweden, a corporation of Sweden Application January 10, 1947, Serial No. 721,286
In Sweden February 7, 1946

7 Claims. (Cl. 315—243)

In high voltage static current converters employing ionic valve vessels provided with separate exciting circuits, a tendency of the exciting arc to be extinguished has frequently been observed, especially when the ratio between the direct current and alternating current voltages has been highly reduced by retarding the instant of ignition, for instance grid control. This has been ascribed, among others, to oscillations in the voltage of the main circuit occurring at the extinction of the main arc. On this occasion, there will be large discontinuities in the voltage across the valve when the aforesaid ratio is reduced, and these discontinuities cause comparatively slowly damped oscillations in the main arc, due to the capacities and inductances of the ionic valve and of the conductors adjacent to the same. These oscillations which have been observed in oscillograms of the voltage across the valve and which are of a frequency of the order of magnitude of $10^4$ or more, can be assumed to cause an occasional attraction of the ionic stream towards the main anode instead of to the cathode, whereby the cathode spot disappears and the exciting arc is extinguished. Such a disturbance which—possibly after some transient phenomena of a more or less irregular character—generally prevents the re-ignition of the main arc, is especially dangerous in inverters having monanodic valve vessels, in which the failure of an ignition in due time as a rule causes full short-circuit of the inverter.

Starting from the just-mentioned assumption about the cause of extinction of the excitation arc, it has been tried to remove the disturbance by connecting in parallel to the ionic valve a damping circuit for instance in the form of a condenser with a series resistance damping the oscillations in the voltage across the valve. It has, however, been found, that although such damping really exists, the disturbing extinction of the excitation arc still often occurs.

The last-mentioned observation has led to the investigation of further causes of the disturbances, and it has finally been found, that apart from oscillations at the extinction of the main arc and other phenomena which shall not be referred to here, also oscillations occurring at the ignition of the main arc may cause such disturbances. These oscillations manifest themselves mainly in the current at small variations of the voltage, and their observation necessitates therefore a much more complicated apparatus than the aforesaid oscillations of the voltage, which may be observed on an oscillograph connected in parallel to the valve. As the said current oscillations are terminated during the course of a few microseconds or decades of microseconds, it has been necessary, in order to prove their existences, to use a complicated apparatus to bring an oscillograph into action only during the short time in which the oscillations exist. It has, however, been possible to observe in this way the oscillations of the current and to prove that their damping is as a rule so small that at least one and generally more half-waves in the negative direction occur which are of a sufficient magnitude to extinguish the excitation arc, and at the next positive half-wave the arc cannot then be re-ignited.

In ionic valve vessels where the condition for reignition, as in the aforesaid type, is the maintaining of an arc spot on the cathode, but where this is effected in another way than by means of an excitation anode, for instance by means of a so-called ignitor or capacitative glow discharge anode, an oscillation of the main current at the ignition may also extinguish the cathode spot, if for instance the igniting impulse by the ignitor or corresponding member is of so short duration as to cease before the occurrence of the last important negative half-wave of the current.

According to the present invention, for preventing the said disturbance, a high voltage current converter using ionic valves is operated in such manner, that the oscillations in the main circuit occurring at the starting of the ionic current (ignition of the main arc) are damped to an essentially aperiodic character, or more precisely so that the first negative half-wave, if existing, is not of such order of magnitude as to extinguish the cathode spot. By reason of the comparatively complicated character of the oscillation circuit which contains two or more time constants, full aperiodicity can as a rule not be attained, but the essential thing is in such cases that the amplitude of the first negative half-wave is not essentially larger than the value which the main current has been able to attain during the same time with respect to the commutation reactances. In such case, the resultant current can never reach such a negative value as to extinguish the cathode spot.

A further investigation of the oscillation phenomena has, however, proved that for the damping of the said current oscillations to such a character as to prevent the occurrence of essential negative wave parts, an essential assistance is obtained from the combination with a damping device of a certain type for the voltage oscillations occurring at the extinction of the main arc, so that the damping means for the current oscillations can then be made smaller. Such a combination therefore also forms an object of the present invention.

In the accompanying drawing, Fig. 1 diagrammatically shows an ionic valve of a high voltage current converter with a form of the invention and Fig. 2 a corresponding diagrammatic view including still an auxiliary device according to the invention. Fig. 3 shows still a form of the invention. Figs. 4–6 show three different current diagrams.

In Fig. 1, the numeral 1 designates a monanodic ionic valve vessel of a high voltage current converter having an anode 2 and a cathode 3. 4 indicates the lead-in conductor of an exciting anode fed for instance from a direct current source 5 and serving to maintain an arc spot on the cathode even when the main anode is extinguished. 6 is a winding phase of a transformer to which the ionic valve is connected. In many cases a two-way connection is employed, in which two ionic valves are connected to the same transformer phase, but this alters nothing in principle in the problems aimed at by the present invention.

The origin has, as already stated, been the observation of the phenomenon, that the cathode spot is often extinguished, especially at large retardations of the instant of ignition of the converter. As such a retardation causes large discontinuities in the voltage across the valve when its arc is extinguished, it has been natural to suppose that the high frequency oscillations caused by the said discontinuities and observed in practice are the cause of the extinction. If they were the only cause, it would be possible to avoid the extinction by connecting in parallel to the valve damping current paths which absorb and damp out the major portion of the voltage oscillations. It has, however, not been found possible to avoid entirely the disturbances in this way, and it has therefore been necessary to find another cause of the fault, which finally has been found in the current oscillations occuring at the ignition of the arc. On this occasion, if the ignition is considerably retarded, there is a comparatively high voltage across the valve, which voltage has charged, with a considerable quantity of electricity, the capacities parallel to the valve, especially those of the transformer terminals and part of the transformer windings, but also of the conductors between the transformer and the valve vessel, and which has been diagrammatically illustrated in Figs. 1–3 by condensers 16 shown in dotted lines. These capacities form with the inductances of the circuit an oscillating current through the valve of a frequency which as a rule lies about $10^6$ or slightly less, although the character of the current is as a rule rather irregular on account of the complicated character of the circuit containing inductances and capacities interlinked with each other. Such an oscillating current $i$ has been diagrammatically illustrated in Fig. 4 superimposed on the load current $I$ which rises comparatively slowly on account of the commutation reactances. It is to be noted that the time scale in Fig. 4 is very large, the whole portion of the curves shown representing a few microseconds, while for instance some hundreds or thousands of microseconds are necessary for reaching the full value of the load current.

As soon as the resultant current $I+i$ can assume negative values during one or several wave portions, there is always a risk of extinction of the cathode spot. For preventing this, a damping path is in Fig. 1 connected in series with the ionic valve vessel, said damping path consisting of a reactor 7 with a parallel resistance 8, so dimensioned with respect to each other as to make the current oscillations occurring at the ignition substantially aperiodic. By reason of the complicated character of the elements of the circuit, it is often not possible to make the oscillation entirely aperiodic, but it will assume substantially the character shown in Fig. 5, but the important thing is then that the resultant of the damped current oscillation and the slowly rising main current cannot assume so large negative values as to extinguish the excitation current.

It will contribute to the just-mentioned result if the inductance value of the reactor 7 is made so large that the length of the cycle of the damped oscillations will be considerably larger than that of the undamped ones, as shown by a comparison between Figs. 4 and 5, as in such case the main current can attain a considerable value before the first negative half-wave presents itself. On the other hand, the inductance 7 should not be so large as to increase materially the commutation reactance, but it should be at least one technical order of magnitude smaller than (at the most one tenth of) the latter. In practice it is generally sufficient to make it one percent of the commutation reactance or less. On the other hand, it should be 5–10 times larger than the natural inductance of the conductors between the transformer terminals and the valve. In a practical example, employing an ionic valve of 50 kv. blocking voltage and 60 ampere current (crest value), an inductance of about 0.5–1 millihenry with a parallel resistance of about 500–1000 ohms has been found appropriate. This will give a substantially aperiodic current oscillation of a frequency of about $10^5$.

The reactor should be as free from capacity as possible and should therefore be air insulated and possibly with the winding turns in zig-zag for obtaining a larger number of turns at the same total length and the same distance between winding turns. It has been found appropriate to divide the resistance into several series-connected portions and to connect it to the reactor at the intermediate points. The damping path should be placed as closely to the valve vessel as possible, and it has been found suitable to mount it on the anode conductor of the vessel.

Fig. 2 shows a combination of the damping members described above and shown in Fig. 1 and the previously known members for damping the voltage oscillations occurring at the extinction of the main arc. These members are shown, as an example, applied to a three-phase rectifier having three transformer windings 6 and three monanodic valve vessels 1 having anodes 2 and cathodes 3, excitation anode conductors 4 and current sources 5 therefor. Reactors 7 with parallel resistances 8 are connected in series with the valve vessels, and in Fig. 1. The damping means for the voltage oscillations consist of condensers 10 with series resistances 11 which, in the form shown, are connected between the transformer terminals and a separate neutral conductor 9. In a two-way connected current converter having two oppositely directed valve vessels connected to each alternating current terminal, it is as a rule sufficient to use only one such group of damping means having a separate neutral (or connected in delta) for one of the three-phase groups, in order to damp the voltage oscillations in both three-phase groups, as their potentials are tied to each other. The damped voltage oscillations will be of a frequency of the order of magnitude of $10^4$ per second.

Fig. 6 shows the modification of the current diagram according to Fig. 5 which is created by the introduction of the voltage oscillation damping device 10, 11 according to Fig. 2. In addition to the normal load current I which rises slowly in the time scale chosen, comes not only the oscillation $i_1$ damped by the reactor 7 and the resistor 8 and having a frequency of the order of magnitude of $10^5$ but also the discharge current $i_2$ from the condenser 10 which at the instant of ignition is charged to the total voltage across the valve vessel. The figure shows the curve for $I+i_2$ and also the curve for $I+i_1+i_2$. The current $i_2$ rises at first rapidly and is then slowly damped down to zero in a time of the order of magnitude of less than one millisecond, say one tenth thereof. The superimposed current $i_1$ may therefore be somewhat larger, of higher frequency and less damped than if the members 10, 11 are omitted, without any risk of the total current sinking appreciably below zero, and as a consequence the inductance 7 and the resistance 8 may be made smaller.

Fig. 3 shows a form of the invention, in which a reactor 12 containing saturable iron is connected between the transformer winding 6 and the valve 1 and a condenser 13 in parallel thereto, as specified in U. S. patent application Serial No. 632,471, of U. Lamm, for the purpose of attenuating the dicontinuities in the voltage curve. The condenser 13 should have no damping resistance, and the condenser 10 with resistor 11 for damping the voltage oscillations at the extinction of the arc, if present, should therefore be placed between the transformer winding and the reactor 12 and therefore cannot have any appreciable influence on the valve at the instant of ignition. In this case and also in other cases, it is recommended to connect a separate condenser 14 with a series resistance 15 across the valve 1 only, thus not in parallel to the reactor 7. If such a condenser is of about the same magnitude as the natural capacity between the transformer winding and the valve, the inductance value of the reactor 7 may under otherwise equal conditions be reduced by about 30–40%.

The expression "conductor capacity" as used in certain of the claims, signifies the capacity between conductors which serve the principal purpose of transporting the current, as distinguished from the capacity of condensers in their proper sense which serve to store electrical charges.

I claim as my invention:

1. In high voltage static current converters, a valve vessel having an arcing cathode, means for feeding a load current through said valve vessel and constituting a minute conductor capacity in parallel therewith, and a minute reactor in parallel with an ohmic resistor connected immediately in series with said valve vessel.

2. In high voltage static current converters, a valve vessel having an arcing cathode, means for feeding a load current through said valve vessel and constituting a minute conductor capacity in parallel therewith, and a practically non-capacitative minute reactor in parallel with an ohmic resistor connected immediately in series with said valve vessel.

3. In high voltage static current converters, a valve vessel having an arcing cathode, means for feeding a load current through said valve vessel and constituting a minute conductor capacity in parallel therewith, and an air insulated minute reactor in parallel with an ohmic resistor connected immediately in series with said valve vessel.

4. In high voltage static current converters, a valve vessel, an anode and an arcing cathode therein, an anode conductor leading current to said anode, means for feeding a load current through said anode and cathode and constituting a minute capacity in parallel to said valve vessel, and a reactor in parallel with an ohmic resistor mounted on said anode conductor and connected in series with said valve vessel.

5. In high voltage static current converters, a valve vessel having an arcing cathode, means for feeding a load current through said valve vessel and constituting a minute conductor capacity in parallel therewith, a condenser in series with a resistor connected in parallel to said valve vessel, and a reactor in parallel with a resistor connected in series with said valve vessel.

6. In high voltage static current converters, a valve vessel, an anode and an arcing cathode therein, an anode conductor leading current to said anode, means for feeding a load current through said anode and cathode and constituting a minute capacity in parallel to said valve vessel, additional small capacity connected in parallel to said valve vessel, and means connected in series with said valve vessel forming with said capacity a strongly damped circuit having a natural tendency of oscillation at a frequency of the order of magnitude of $10^5$ per second.

7. In high voltage static current converters, a valve vessel having an arcing cathode, means for feeding a load current through said vessel and constituting a minute conductor capacity in parallel therewith, means connected in series with said valve vessel forming with said capacity a strongly damped circuit having a natural tendency of oscillation at a frequency of the order of magnitude of $10^5$ per second, a reactor having a saturable iron core in series with said valve vessel and oscillating means, and a capacitor connected in parallel to said vessel.

JOHANNES HANSEN.

REFERENCES CITED

The following references are of record in the file of this patent:

UNITED STATES PATENTS

| Number | Name | Date |
|---|---|---|
| 1,939,456 | Lord | Dec. 12, 1933 |
| 2,037,837 | Usselman | Apr. 21, 1936 |
| 2,078,110 | Trogert | Apr. 20, 1937 |